(12) United States Patent
Lee et al.

(10) Patent No.: US 9,411,561 B2
(45) Date of Patent: Aug. 9, 2016

(54) APPARATUS AND METHOD FOR CHANGING THEME OF APPLICATION IN PORTABLE TERMINAL

(75) Inventors: Jae-Min Lee, Seoul (KR); Jang-Hyun Yoon, Gyeonggi-do (KR); Ki-Bong Choi, Gyeonggi-do (KR); Ji-Hyun Kim, Gyeonggi-do (KR); Hyun-Suk Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 1028 days.

(21) Appl. No.: 13/556,798

(22) Filed: Jul. 24, 2012

(65) Prior Publication Data
US 2013/0031468 A1 Jan. 31, 2013

(30) Foreign Application Priority Data
Jul. 25, 2011 (KR) .................. 10-2011-0073385

(51) Int. Cl.
*G06F 17/00* (2006.01)
*G06F 9/44* (2006.01)

(52) U.S. Cl.
CPC .............. *G06F 8/38* (2013.01); *G06F 9/4443* (2013.01)

(58) Field of Classification Search
CPC ............ G06F 8/74; G06F 8/38; G06F 3/4443
See application file for complete search history.

(56) References Cited

U.S. PATENT DOCUMENTS

| | | | |
|---|---|---|---|
| 8,346,223 B1 * | 1/2013 | Byrnes ................... H04L 29/04 370/486 |
| 2003/0221189 A1 * | 11/2003 | Birum ..................... G06F 8/65 717/170 |
| 2006/0059430 A1 * | 3/2006 | Bells ..................... G06F 3/0484 715/747 |
| 2006/0168559 A1 * | 7/2006 | Park .............................. 717/105 |
| 2007/0094588 A1 * | 4/2007 | Klassen et al. ............. 715/501.1 |
| 2007/0283048 A1 * | 12/2007 | Theimer ............. H04L 12/5835 709/246 |
| 2008/0127170 A1 * | 5/2008 | Goldman .................. G06F 8/61 717/174 |
| 2008/0189600 A1 * | 8/2008 | Lau et al. ....................... 715/235 |
| 2008/0243892 A1 * | 10/2008 | Little ................ G06F 17/30569 |
| 2008/0295027 A1 * | 11/2008 | Seo et al. ....................... 715/810 |
| 2009/0055758 A1 * | 2/2009 | Sim et al. ...................... 715/762 |
| 2009/0198977 A1 * | 8/2009 | Gschwind ........... G06F 9/30025 712/226 |
| 2009/0300483 A1 | 12/2009 | Viet |

(Continued)

OTHER PUBLICATIONS

Bdemartino, Newbie's How To: Port Theme's, Feb. 20, 2011, xda-developers, pp. 1-13 retrieved: http://forum.xda-developers.com/showthread.php?t=962136.*

William Wilson, JApplets and Standard Java Applications, May 26, 2007, Dream.In.Code, pp. 1-5 Retrieved: http://www.dreamincode.net/forums/topic/28410-application-to-japplet-and-reverse/.*

Ben Rockwood, Building Interfaces with Edje, Aug. 15, 2003, the Edje Developers Guide, pp. 1-18 Retrieved:http://www.cuddletech.com/edje/docs/html/edje_book.html.*

(Continued)

*Primary Examiner* — Scott Baderman
*Assistant Examiner* — Howard Cortes
(74) *Attorney, Agent, or Firm* — The Farrell Law Firm, P.C.

(57) ABSTRACT

An apparatus and a method for changing a theme form of an application to conform the user experience to a web application or a native application in a portable terminal. The apparatus for changing the application theme in the portable terminal may comprise a controlling unit for changing an application theme into an application theme of a different device type, a displaying unit for outputting a change process of the application theme and the application to which the changed theme is applied, an inputting unit for generating a change request of the application theme and a theme application managing unit for converting theme data, obtained from compiled data of an application, through an inverse-compiling process, to data suitable for the theme form of a second application.

12 Claims, 4 Drawing Sheets

(56) References Cited

U.S. PATENT DOCUMENTS

| | | | |
|---|---|---|---|
| 2011/0119603 A1* | 5/2011 | Peltz | G06F 9/45512 715/762 |
| 2012/0151433 A1* | 6/2012 | Amodio et al. | 717/105 |
| 2012/0324476 A1* | 12/2012 | Reissman et al. | 719/312 |

OTHER PUBLICATIONS

JThinks, Retheming with Edje, Oct. 26, 2008, pp. 1-10 Retrieved: http://jthinks.com/retheming-with-edje/.*

* cited by examiner

APPARATUS AND METHOD FOR CHANGING THEME OF APPLICATION IN PORTABLE TERMINAL

PRIORITY

The present application claims priority under 35 U.S.C. §119(a) to a Korean patent application filed in the Korean Intellectual Property Office on Jul. 25, 2011 and assigned Serial No. 10-2011-0073385, the entire disclosure of which is hereby incorporated by reference.

BACKGROUND OF THE INVENTION

1. Field of the Invention

The present invention relates generally to an execution of an application in a portable terminal.

2. Description of the Related Art

A portable terminal is used by people of all ages as a necessity of modern life, and service providers and terminal manufacturers have been developing various products and services for use with the portable terminal.

The portable terminal has evolved into a multi-media device capable of providing various services such as a phone book, messaging, e-mail, alarm clock, MP3 player, schedule management, digital camera, multimedia messaging and wireless Internet services.

In addition, a user of the portable terminal may download and install a paid or free application providing additional functionality. An application operating in a portable terminal may be classified as a native application and a web application. A web application generally operates in a web browser, and a native application generally operates by utilizing an Application Programming Interface (API) defined for a specific platform.

A web application may have a theme configuration (for example, font, font size, font color, background screen, menu form and the like) different from that of the native application and as a result, user experience may differ depending on the application format (web application and native application), even though application functionality is identical.

That is, the web application may provide a layout based on a web browser and the native application may provide another layout depending on the application design, resulting in a different user experience of an identical application depending on the application format. If the user of the portable terminal is comfortable with the theme configuration of the native application, he may want the theme configuration of the web application to be set as that of the native application.

The difficulty in utilizing the theme of the native application as discussed above, is that a developer has to design an identical application in a native application format and web application format, and the user has to select a favorite format to use.

Hence, to solve the above-mentioned problems, an apparatus and a method for converting script data of an application into a suitable application format in a portable terminal are required.

SUMMARY OF THE INVENTION

Accordingly, the present invention has been made to solve at least the above-mentioned problems and/or disadvantages and to provide at least the advantages below. Accordingly, and an aspect of the present invention is to provide an apparatus and a method for supporting an application of a different device type in a portable terminal.

Another aspect of the present invention is to provide an apparatus and a method for changing a theme configuration of an application by changing a script of an application in a portable terminal.

Yet, another aspect of the present invention is to provide an apparatus and a method for generating an application to support a plural of application forms in a portable terminal.

According to an aspect of the present invention, an apparatus for changing the theme of an application includes a controlling unit for converting an application theme to be changed into an application theme of a different device type, a displaying unit for outputting a change process of the application theme and the application to which the changed theme is applied, an inputting unit for generating a change request of the application theme and a theme managing unit for converting obtained conversion data into components suitable for a theme form of a second application, after obtaining the conversion data from compiled data of the application through an inverse-compiling process.

According to another aspect of the present invention, a method for changing the application theme in a portable terminal includes obtaining a conversion data from compiled data of the application for changing the theme, through an inverse-compiling process and converting the obtained conversion data into components suitable for a theme form of a second application, wherein the second application is an application of a different device type, for which the theme is changed.

BRIEF DESCRIPTION OF THE DRAWINGS

The above and other aspects, features and advantages of the present invention will be more apparent from the following description taken in conjunction with the accompanying drawings, in which.

DETAILED DESCRIPTION OF EMBODIMENTS OF THE PRESENT INVENTION

Various embodiments of the present invention are described in detail with reference to the accompanying drawings. Detailed description of known functions or constructions are omitted to avoid obscuring the subject matter of the present invention.

Embodiments of the present invention provide an apparatus and a method for changing a theme form of an application and processing a web application and a native application to conform user experience to the web application and native application in the portable terminal.

Embodiments of the present invention provide an application and a method for automatically changing a script data of an application to support an application of a different device type, which may be an application operating based on a web-browser and a native application operating with an API defined in a specific platform.

Figure 1:
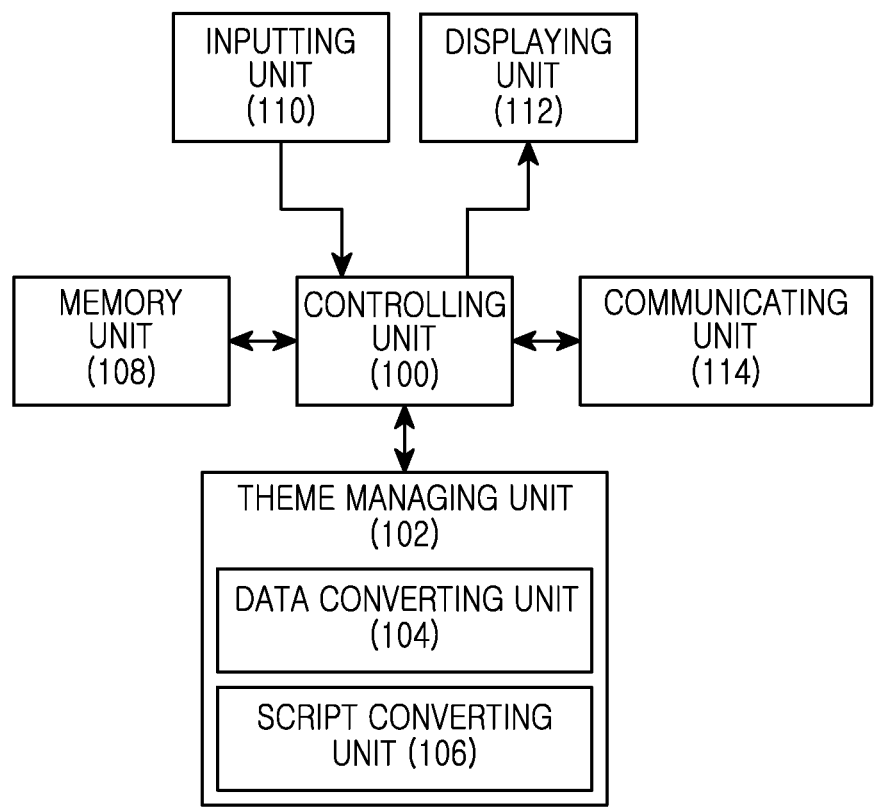
FIG. 1 is a block diagram illustrating a configuration of a portable terminal to change an application theme according to the present invention.

FIG. 1 is a block diagram illustrating a configuration of a portable terminal to change an application theme according to the present invention.

Referring FIG. 1, the portable terminal includes a controlling unit 100, a theme managing unit 102, a memory unit 108, an inputting unit 110, a displaying unit 112 and a communicating unit 114. And the theme managing unit 102 may comprise a data converting unit 104 and a script converting unit 106.

The controlling unit 100 of the portable terminal controls the overall operation of the portable terminal. For example, the controlling unit 100 may carry out a process and control for voice communication and data communication. In addition to the general functions, the controlling unit 100 may carry out supporting an application of a different device type in the portable terminal according to the present invention. That is, the controlling unit 100 may automatically convert script data and utilize a theme configuration regardless of an application form to conform user experience of the application.

The controlling unit 100 controls the theme managing unit 102, and converts a theme of a web application into that of a native application and vice versa. In addition, the method described herein may be provided as one or more instructions in one or more software modules stored in the storage device. The software modules may be executed by the controller.

The theme managing unit 102 changes a theme form of an application according to the control of the controlling unit 100. For example, the theme of the web application may be converted into the theme of the native application in the portable terminal and vice versa.

The data converting unit 104 of the theme managing unit 102 obtains conversion data through inverse-compilation of the compiled data of the application in order to edit a script file of the application to which a theme conversion intends to be applied. The conversion data may be Cascading Style Sheet (CSS) data to the compiled data of the web application or Edje Data Collection (EDC) data to the compiled data of the native application.

The script converting unit 106 of the theme managing unit 102 converts theme components of the conversion data converted by the data converting unit 104 into theme components suitable for a form of a second application. That is, after the script converting unit 106 determines the components of the script file of the native application such as background, font, font size, font color and the like, the script conversion unit 106 converts the determined components into components suitable for the script file of the native application.

The theme managing unit 102 (the data converting unit 104 and/or script converting unit 106) may be referred to as another controller.

The memory unit 108 may comprise a ROM, a RAM and a flash ROM. The ROM may store the micro-cord of a program for processing and controlling the controlling unit 100 and the theme managing unit 102, and various reference data.

When the memory unit 108 comprises a RAM as the working memory of the controlling unit 100, the controlling part 100 stores temporary data generated during the operation of various programs. When the working memory is a flash ROM, the flash ROM stores renewable various data for filing such as a phone book, an outgoing message, an incoming message and the like, and may store a web application or a native application downloaded through the Internet or supplied from the portable terminal according to an embodiment of the present invention.

The method executed by the theme managing unit 102 (the data converting unit 104 and/or script converting unit 106) may be provided as one or more instructions in one or more software modules stored in the memory unit 108. In that case, the software modules are executed by the controller unit 100.

The inputting unit 110 may comprise numeral buttons from 0 to 9, a menu button, a cancel button, a verify button, a call button, an end button, an access button, navigation key (or direction keys) buttons, character input keys and the like, and provides the controlling unit 100 with key input data corresponding to keys pressed by a user. In addition, the inputting unit 110 provides the controlling unit 100 with input data at the request of a user for changing the theme of an application stored previously.

The displaying unit 112 displays status information, characters, many moving pictures, many images and the like generated during the operation of the portable terminal. The displaying unit 112 may use a color liquid display apparatus, AMOLED and the like, and the displaying unit 112 may have a touch input device to use as an input means for applying a touch input type for the portable terminal. In addition, the displaying unit 112 may display an application whose theme is converted according to the present invention. A touch sensitive display, referred to as a touch screen, may be used as the display unit 112 and touch input may be performed via the touch sensitive display.

The communicating unit 114 transmits and receives wireless signals of data input and output through an antenna. For example, the communicating unit 114 may channel-code and spread data to be transmitted and generate RF signals for transmitting. Further, the communicating unit 114 may convert the received RF signal into a base band signal to spread and channel-decode the signal for restoring the data.

The role of the theme managing unit 102 may be performed by the controlling unit 100 of the portable terminal, but it is separated from the controlling unit 100 in the foregoing description for convenience and illustration purposes only and not intended to limit the present invention. Alternatively, all of the functions described above may be performed by the controlling unit 100.

Figure 2:
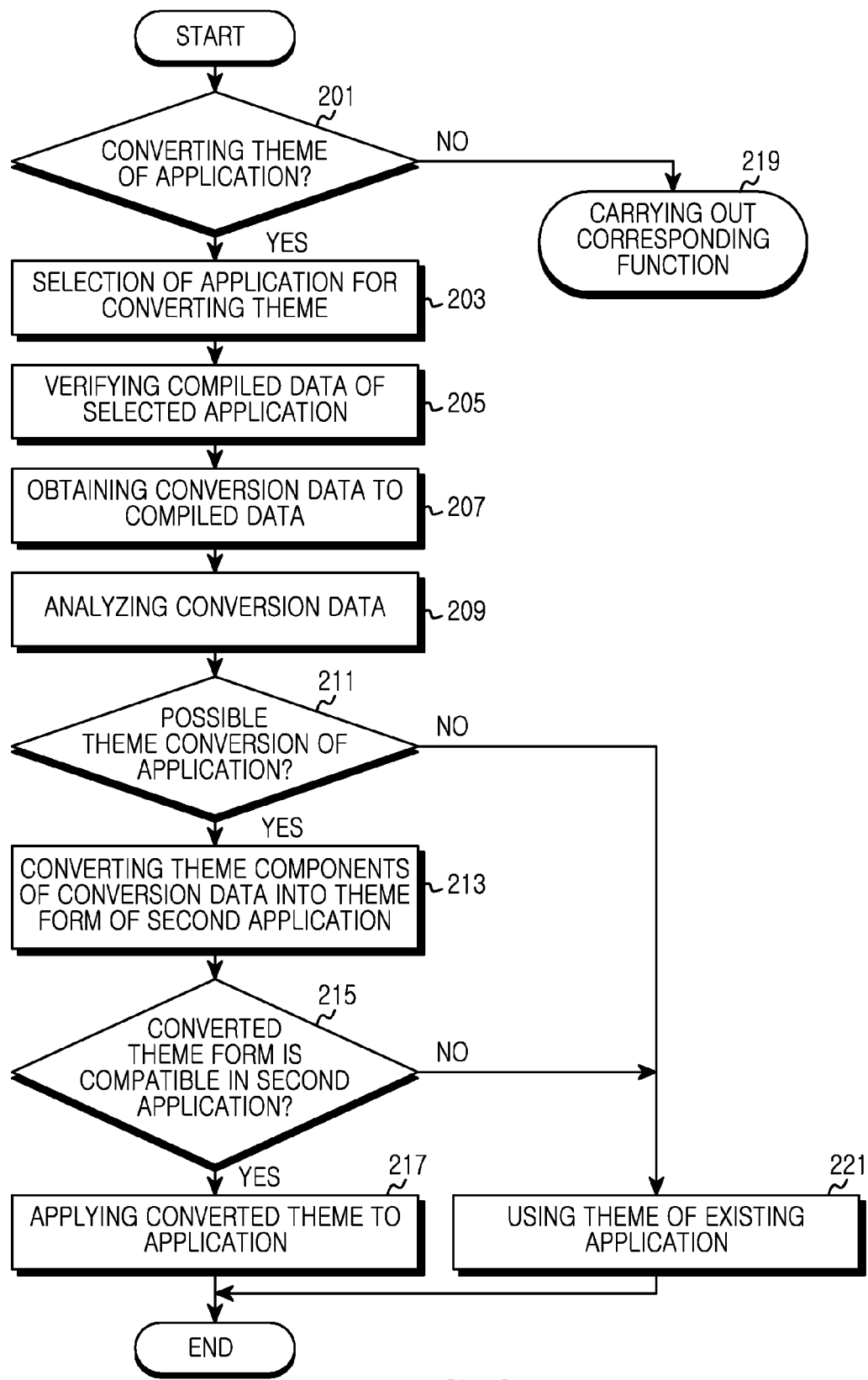
FIG. 2 is a flowchart illustrating a process for changing an application theme into a suitable platform type.

FIG. 2 is a flowchart illustrating a process for changing an application theme into a suitable platform type.

Referring to FIG. 2, in Step 201 it is verified whether a theme of an application is changed in the portable terminal. Changing the theme of the application refers to changing the theme configuration (for example, shape of button, wallpaper, font, size of font and color of font and the like) of the application supplied from the portable terminal, the Internet or a peripheral portable terminal, and the theme configuration of a web application may be changed into that of a native application or vice versa. The web application is an application operating in a web browser, and the native application is an application operating by using an API defined for a specific platform. Generally, the theme configuration of the web application is different from that of the native application, and a user has a different experience of an identical application depending on the form of application (web application, native application). Hence, a user of the portable terminal comfortable with the theme configuration of the native application may prefer the theme configuration of the web application to be set to that of the native application.

If it is verified that the application theme is not to be changed in Step 201, a corresponding function (for example, standby mode) may be performed in the portable terminal in Step 219.

If it is verified that the application theme is changed in Step 201, an application whose theme intends to be changed is selected in Step 203 in the portable terminal. In that case, a web application or native application for changing the theme among applications stored previously is selected in the portable terminal. In that case, if the web application is selected in the portable terminal in Step 203, the theme configuration of the web application selected by the user results in the web application being changed into the theme configuration of the native application in the portable terminal, while if the native application is selected in the portable terminal in Step 203, the theme configuration of the native application selected by the user results in the native application being changed into the theme configuration of the web application in the portable terminal.

In Step 205, the compiled data of the selected application may be verified in the portable terminal. If a web application is selected in Step 203, the complied data includes data made by compiling CSS file, while if a native application is selected in Step 203, the compiled data includes data made by compiling EDC file.

The compiled data may be inverse-compiled for obtaining a conversion data to the compiled data in the portable terminal in Step 207. The conversion data includes a CSS file or EDC file to the compiled data.

In Step 209, the conversion data obtained in Step 207 is analyzed in the portable terminal, and it is verified whether it is possible to change the theme in Step 211 in the portable terminal. In that case, it can be verified whether requisite theme components (for example, font, size, wallpaper, color and the like) for composing a layout construction of the application selected by the user is included in the portable terminal.

If it is verified that it is impossible to change the application theme in Step 211 (because the requisite theme components for composing the layout construction is not included), an existing application theme, that is the application theme selected in Step 203 is utilized in the portable terminal in Step 221.

In step 211, it is verified that it is possible to change the application theme (because the requisite theme components for composing the layout construction are included). In Step 213, the theme components of the conversion data are converted into a theme form of a second application. In this case, the second application is an application intended to support the converted theme. That is, if the native application is selected for changing the theme in the portable terminal, the conversion data of the native application is converted into component data of a web application form in Step 213. If the web application is selected for changing the theme in the portable terminal, the conversion data of the web application is converted into the component data of the native application form in Step 213.

In Step 215, it is verified whether the converted data form is compatible in the second application in the portable terminal.

If it is verified that the converted theme form is not compatible, the existing application theme that is, the application theme selected in Step 203, is utilized in Step 221 in the portable terminal.

If it is verified that the theme form converted in Step 215 is compatible, the theme converted in Step 217 is applied in Step 217 in the portable terminal. Therefore, if a provider for supplying the application provides some application using one script sheet regardless of the application form, an application suitable for a form desired by the user is provided by converting the script sheet in the portable terminal.

Figure 3:
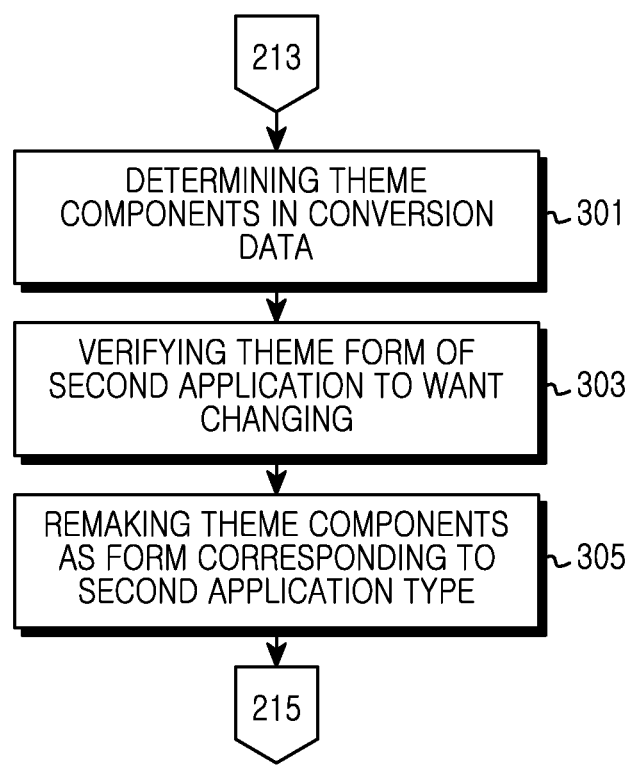
FIG. 3 is a flowchart illustrating a process for changing a form of an application theme in a portable terminal according to an embodiment of the present invention.

FIG. 3 is a flowchart illustrating a process for changing the form of an application theme in a portable terminal according to an embodiment of the present invention.

Referring to FIG. 3, as in Step 213 in FIG. 2, theme components of conversion data are converted into a theme form of a second application in the portable terminal.

In order to perform the same operation described above, theme components are determined in the converted data in Step 301, and then a theme form of a second application for converting is verified in Step 303. Here, in Step 301, a script area corresponding to the theme components in the converted data is verified and, in Step 303, it is verified that the application selected by the user is converted into a web application form or a native application form.

In Step 305, the theme components are re-made as a form corresponding to the second application in the portable terminal. That is, the previously selected theme components such as color, menu form and the like are changed into a theme corresponding to the second application in the portable terminal. Further, as in Step 214 in FIG. 2, a process for verifying whether the converted theme form is compatible in the second application is performed.

Figure 4:
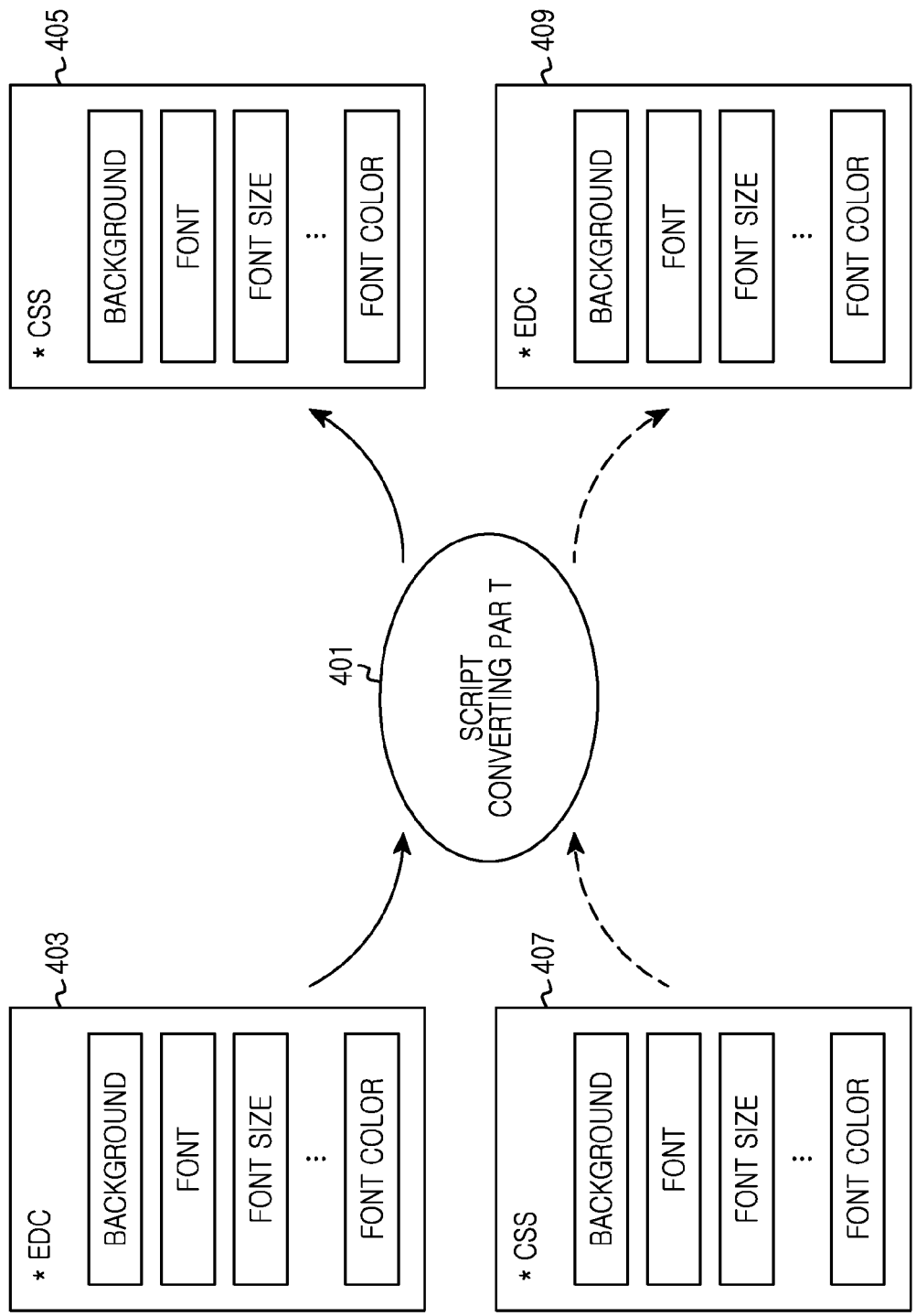
FIG. 4 is a flowchart illustrating a process for changing a form of an application theme in a portable terminal according to an embodiment of the present invention.

FIG. 4 is a flowchart illustrating a process for changing the form of an application theme in a portable terminal according to an embodiment of the present invention.

Referring to FIG. 4, an application for converting is selected for changing a theme configuration (for example, button shape, wallpaper, font and size, color and the like) of an application supplied from the portable terminal or an application supplied from the Internet or a peripheral portable terminal in the portable terminal.

For example, a theme of a native application is converted into a theme of a web application in the portable terminal (indicated as a solid line).

In order to perform the operation described above, the script converting unit 401 of the portable terminal converts the script file 403 of the native application selected previously into a script file 405 of the web application.

That is, the script converting unit 401 determines the theme configuration components such as background, font, font size, font color in the script file 403 of the native application, and converts the determined components into components suitable for the script file 405 of the web application.

Alternatively, the theme of the web application may be converted into the theme of the native application in the portable terminal (indicated as dashed line).

In order to perform the operation described above, the script converting unit 401 of the portable terminal converts the script file 407 of the web application selected previously into the script file 409 of the native application.

That is, the script converting unit 401 determines the theme configuration components such as background, font, font size, font color and the like in the script file 407 of the web application and converts the determined components into components suitable for the script file 409 of the native application.

Therefore, one application may be composed of a web application theme and a native application theme in the portable terminal. That is, the theme suitable for the web application form or the theme suitable for the native application form may be applied using one script sheet in the portable terminal.

Embodiments of the present invention can be implemented as hardware, software or a combination of hardware and software. The software may be stored in the form of volatile or non-volatile storage such as, for example, a storage device like a Read Only Memory (ROM), erasable or rewritable, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. The storage devices and storage media are implemented as machine-readable storage that is suitable for storing a program or programs comprising instructions that, when executed, perform the method of the present invention. Accordingly, embodiments of the present invention provide a program comprising code for implementing an apparatus or a method of the present invention described herein and a machine-readable storage storing such a program. Further, such programs may be conveyed electronically via any medium such as a communication signal carried over a wired or wireless connection. As discussed above, the present invention provides support for different device types in the portable terminal and conforms user experience of the application, by automatically converting the script data of the application and utilizing the theme configuration regardless of the application format.

While the present invention has been shown and described with reference to various embodiments thereof, it will be understood by those skilled in the art that changes in form and detail may be made without departing from the spirit and scope of the present invention as defined by the appended claims.

What is claimed is:

1. A portable terminal comprising:
a memory configured to store a plurality of applications;
an inputting unit configured to select an application among the plurality of applications; and
a hardware controller configured to:
determine whether a form of the selected application is changeable into a different form,
in response to determining that the selected application is changeable into the different form, process the selected application by converting the form into the different form, and
in response to determining that the selected application is not changeable into the different form, process the selected application using a non-converted form of the selected application,
wherein the hardware controller is further configured to, if at least one component for composing a layout construction is obtained from compiled data of the selected application, determine that the selected application is changeable, and
wherein the compiled data comprises at least one of Edje Data Collection (EDC) data of a native application and Cascading Style Sheet (CSS) data of a web application.

2. The portable terminal of claim 1, wherein the at least one component comprises at least one of a background, a font, a font size, a font color, and a menu form from obtained conversion data.

3. The portable terminal of claim 1, wherein the hardware controller is further configured to convert the form into the different form by converting a theme of the selected application into a theme of a different type.

4. The portable terminal of claim 1, wherein the hardware controller is further configured to, if the converted form is not compatible at the portable terminal, process the selected application using the non-converted form of the selected application.

5. A method for changing a theme of an application in a portable terminal, the method comprising:
selecting an application among a plurality of applications stored in the portable terminal;
determining whether a form of the selected application is changeable into a different form;
in response to determining that the selected application is changeable into the different form, processing the selected application by converting the form into the different form; and
in response to determining that the selected application is not changeable into the different form, processing the selected application using a non-converted form of the selected application,
wherein determining whether the form of the selected application is changeable into the different form comprises determining whether at least one component for composing a layout construction is obtained from compiled data of the selected application, and
wherein the compiled data comprises at least one of Edje Data Collection (EDC) data of a native application and Cascading Style Sheet (CSS) data of a web application.

6. The method of claim 5, wherein the at least one component comprises at least one of a background, a font, a font size, a font color, and a menu form from obtained conversion data.

7. The method of claim 5, wherein converting the form into the different form comprises converting a theme of the selected application into a theme of a different type.

8. The method of claim 5, further comprising;
if the converted form is not compatible at the portable terminal, processing the selected application using the non-converted form of the selected application.

9. A portable terminal for changing a theme of an application, comprising:
one or more hardware controllers;
a memory unit; and
one or more modules configured for execution by the hardware controller, the modules including one or more instructions to:
select an application among a plurality of applications stored in the portable terminal,
determine whether a form of the selected application is changeable into a different form,
in response to determining that the selected application is changeable into the different form, process the selected application by converting the form into the different form, and
in response to determining that the selected application is not changeable into the different form, process the selected application using a non-converted form of the selected application,
wherein the selected application is determined to be changeable, if at least one component for composing a layout construction is obtained from compiled data of the selected application, and
wherein the compiled data comprises at least one of Edje Data Collection (EDC) data of a native application and Cascading Style Sheet (CSS) data of a web application.

10. The portable terminal of claim 9, wherein the at least one component comprises at least one of a background, a font, a font size, a font color, and a menu form from obtained conversion data.

11. The portable terminal of claim 9, wherein the form is converted into the different form by converting a theme of the selected application into a theme of a different type.

12. The portable terminal of claim 9, wherein the selected application is processed using the non-converted form of the selected application, if the converted form is not compatible at the portable terminal.

* * * * *